United States Patent

[11] 3,633,965

[72] Inventors Neville Marshall Norman
90 Sandyhurst Lane;
Derek Colebrock Morley, Victoria Road,
both of Ashford, Kent, England
[21] Appl. No. 804,611
[22] Filed Mar. 5, 1969
[45] Patented Jan. 11, 1972
Original application Apr. 11, 1967, Ser.
No. 630,022, now Patent No. 3,512,830.
Divided and this application Mar. 5, 1969,
Ser. No. 804,611

[54] SAFETY BELTS
17 Claims, 15 Drawing Figs.
[52] U.S. Cl. .................................................. 297/385,
24/205.17, 24/230
[51] Int. Cl. ........................................................ A62b 35/60
[50] Field of Search............................................ 297/389,
385; 24/73.05, 205.17, 230.1, 230.1 U, 230

[56] References Cited
UNITED STATES PATENTS

| | | | |
|---|---|---|---|
| 1,899,656 | 2/1933 | Wigley et al. ................. | 24/73.05 |
| 2,171,496 | 8/1939 | Waite et al..................... | 24/73.05 |
| 2,442,119 | 5/1948 | Drozinski ...................... | 24/73.05 |
| 2,833,555 | 5/1958 | Zotkewicz..................... | 297/389 |
| 2,856,991 | 10/1958 | Princiotta..................... | 297/389 |
| 2,888,063 | 5/1959 | Rose............................. | 297/389 |
| 3,454,304 | 7/1969 | Hudak........................... | 297/389 |
| 3,463,545 | 8/1969 | Curran .......................... | 297/389 |

FOREIGN PATENTS

| | | | |
|---|---|---|---|
| 519,108 | 3/1940 | Great Britain................ | 24/205 |
| 1,090,972 | 10/1960 | Germany..................... | 24/205.17 |

*Primary Examiner*—James T. McCall
*Attorney*—Robert I. Pearlman

ABSTRACT: The invention provides a safety belt for a vehicle having a backstrap portion arranged to contact the vehicle seat backrest to restrain its forward movement and a front strap portion to restrain the forward movement of the wearer. The invention further provides a combination of a safety belt and child's seat in which the child's seat is restrained from forward movement independently of a child in the seat.

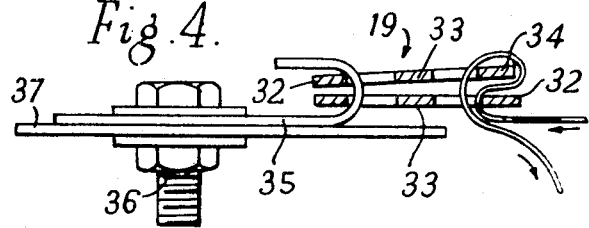
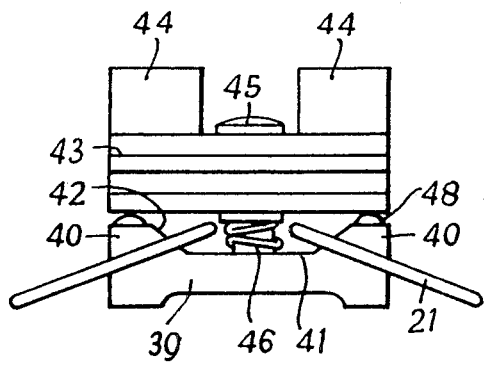
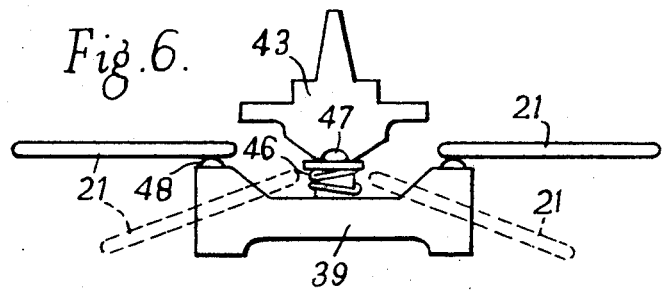
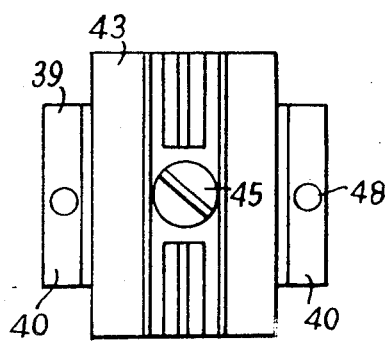

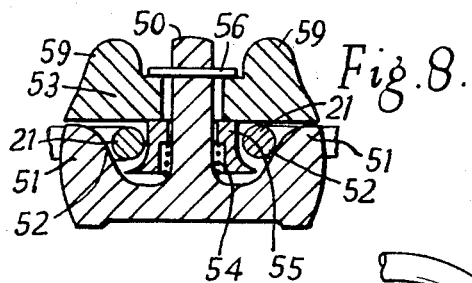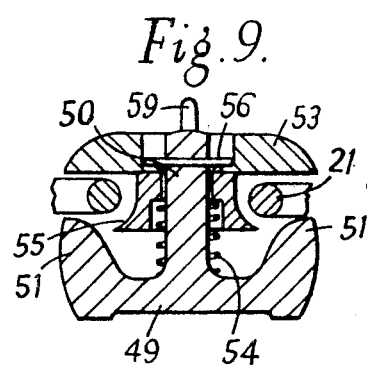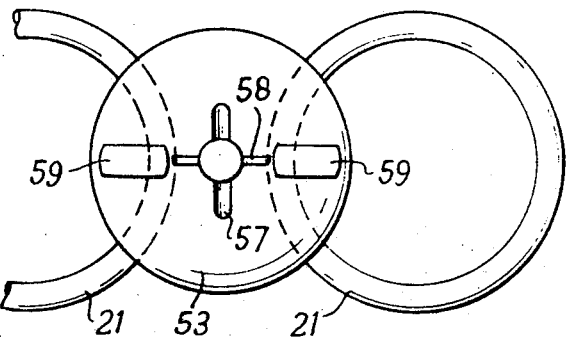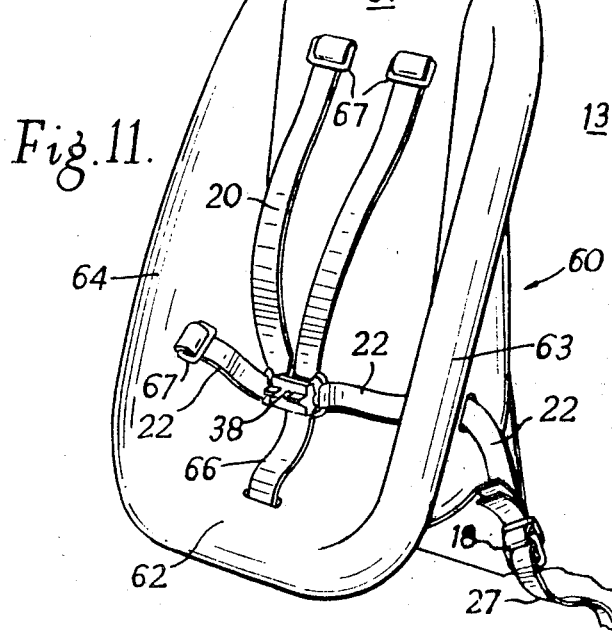

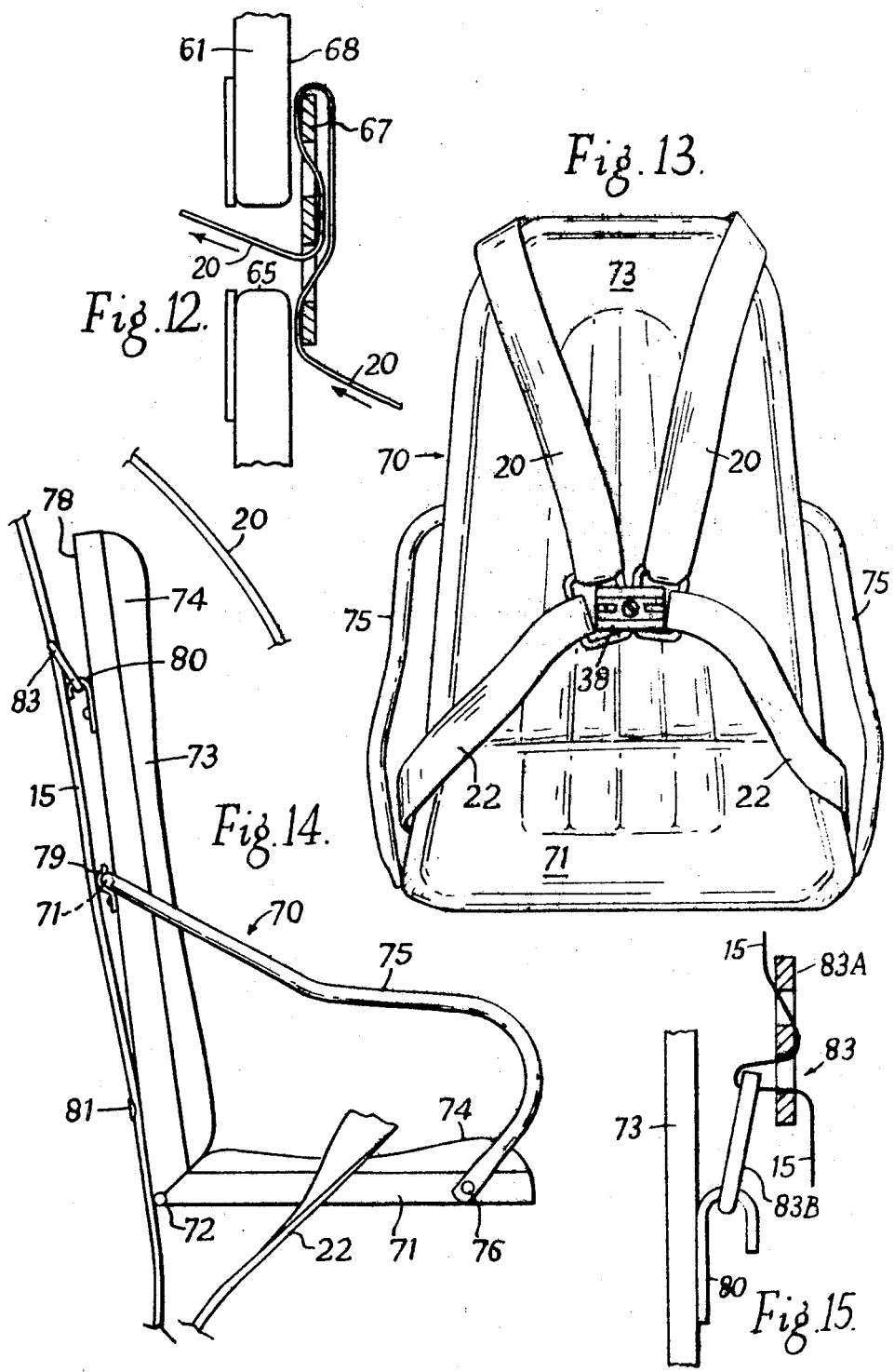

SAFETY BELTS

This application is a division of application Ser. No. 630,022 filed Apr. 11, 1967, now U.S. Pat. No. 3,512,830.

BACKGROUND OF THE INVENTION

This invention relates to safety belts for vehicles, particularly belts suitable for use on the back seat of a vehicle, as well as to a combination of a safety belt and a child's seat. Hip-strapping means and the well-known shoulder holsters illustrate prior art safety belt constructions.

SUMMARY OF INVENTION

It is an object of the invention to provide a safety belt capable of adjustment for use by wearers of greatly different sizes. It is a further object to provide a belt which restrains forward movement of the seat backrest of the vehicle. It is still a further object to provide a combination of a safety belt and a child's seat in which the child's seat is restrained from forward movement independently of a child in the seat.

Accordingly in one aspect the invention provides a safety belt for a vehicle having a seat backrest comprising a strap capable in operation of being looped over a wearer's shoulder so that one part of the strap extends down the front of the wearer for attachment at its lower end to an anchorage or anchored buckle and means are provided for attaching the top of the strap to an anchorage behind the top of a vehicle seat backrest, the improvement comprising that another part of the strap extends down the back of the wearer for attachment to an anchorage or anchored buckle, the arrangement being such that in operation that part of the strap arranged to extend down the front to the wearer restrains the wearer from forward movement and the other part of the strap exerts backward pressure on the seat backrest.

In another aspect the invention provides a safety belt for use on the seat of a vehicle having a seat backrest comprising a strap having a front part intended in operation to pass in front of the wearer and having at its upper end means for anchorage behind the top of the seat backrest, at an intermediate point carrying a clasp attachment means and adjacent its lower end having means for anchorage to a part of the vehicle structure below the bottom of the seat backrest, the improvement comprising a back part intended in operation to contact the seat backrest and having means for anchoring its lower end to a part of the vehicle structure below the bottom of the seat backrest and its upper end connecting with the front part, each of the front and back parts being adjustable in length, and a releasable clasp for connection to the clasp attachment means to form a lap connection.

In a third aspect the invention provides a safety belt for a vehicle having a seat backrest comprising a strap having a front part intended to pass in front of a wearer and having its ends anchored, the improvement comprising a pair of anchor straps which are respectively secured at spaced-apart locations to a part of a vehicle structure below the bottom of the vehicle seat backrest and terminate in nonslip adjustable buckles in front of the lower part of the backrest, a pair of straps each having a back part extending from a respective one of the buckles upwardly over the surface of the backrest through a sliding buckle anchored to a location behind the top of the backrest, the straps after passing through the sliding buckles thereafter each comprising the front part to extend over a wearer's shoulder, the two front parts passing down the front of the wearer for attachment to a clasp at a position approximately centrally of the wearer's waistline, and from the clasp attachment each front part then comprising a lap belt joined to an adjacent one of the nonslip adjusting buckles.

In a fourth aspect the invention provides in combination a safety belt for a vehicle and a child's seat, the belt being arranged to pass in front of the child to restrain forward movement, the improvement comprising separate means for securing the seat to the belt to restrain forward movement of the seat.

In a fifth aspect the invention provides a clasp for attaching together two rings the clasp comprising a base member having a pair of projections at opposite sides extending upwardly from the upper surface of the base member, and a locking member mounted on a post on the base member for rotation between a locked position in which the clasp rings cannot be moved between the projections and the locking member, and an open position in which there is a sufficient gap between the projections and the locking member to allow easy movement of the clasp rings therebetween and in which the projections are joined to the upper surface of the base member by upwardly and outwardly inclined surfaces.

DRAWINGS

Embodiments of safety belt arrangements, in accordance with the invention will now be described, by way of example only, with reference to the accompanying drawings of which:

FIG. 1 is a view of a safety belt on the back seat of a vehicle,
FIG. 2 shows a bottom anchorage for the belt of FIG. 1,
FIG. 3 is a detailed view of one of the nonslip buckles of FIG. 1,
FIG. 4 shows a top anchorage for the belt of FIG. 1,
FIG. 5 is a detail side view of the clasp of FIG. 2 in its locked position,
FIG. 6 is a detail side view of the clasp of FIG. 5 in its open position,
FIG. 7 is a plan view of the clasp of FIG. 6,
FIG. 8 is a sectional view through an alternative clasp in its locked position,
FIG. 9 is a sectional view through the clasp of FIG. 8 in its open position,
FIG. 10 is a plan view of the clasp of FIG. 8,
FIG. 11 is a front view of the belt of FIG. 1 in combination with one form of child's auxiliary seat,
FIG. 12 is a sectional side view through part of the combination of FIG. 11,
FIG. 13 is a front view of the belt of FIG. 1 in combination with a further form of child's auxiliary seat,
FIG. 14 is a side view of the chair of FIG. 13 and,
FIG. 15 is a sectional side view through part of the combination of FIG. 14 sowing buckle 83 in detail.

DETAILED DESCRIPTION

Figure 1:
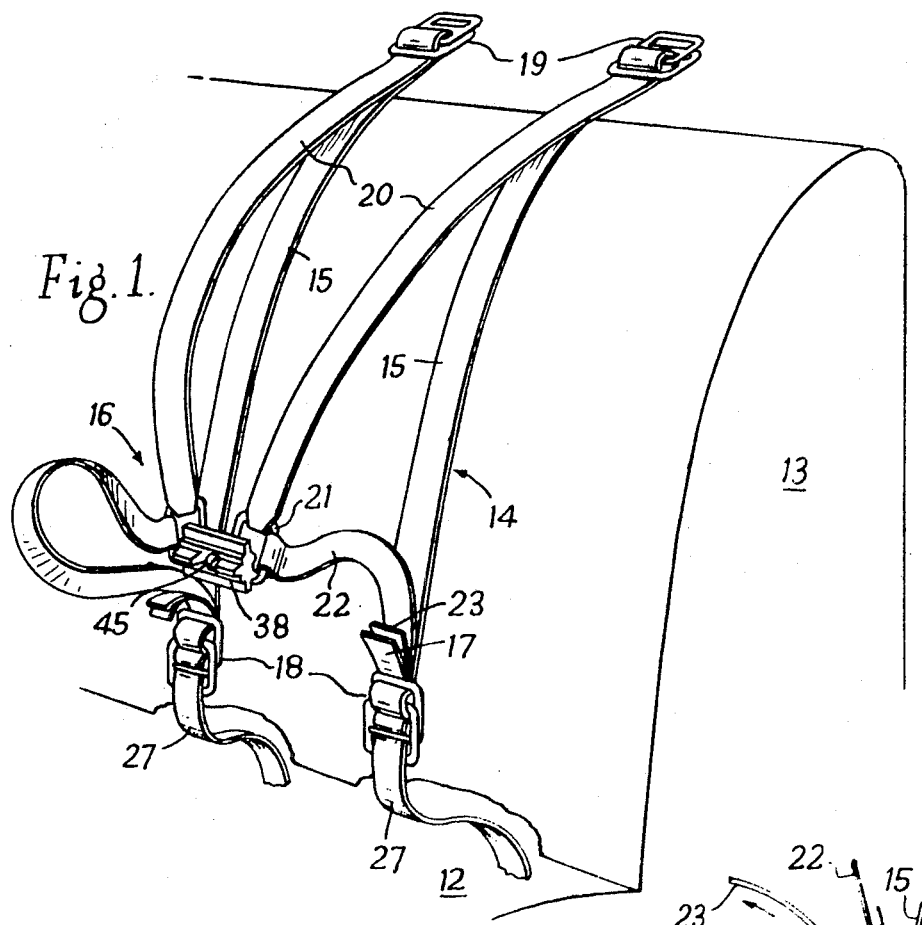
Figure 2:
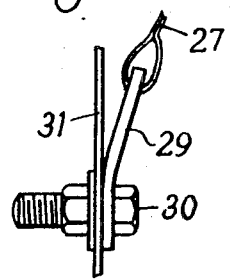
Figure 3:
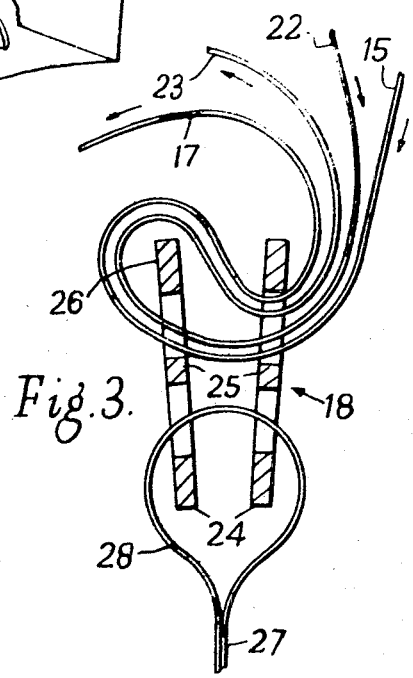

Referring to FIGS. 1 to 4, the back seat of a car is shown having a seat portion 12 and a backrest 13. The safety belt comprises two straps 14 each consisting of a back part 15 and an integral front part 16. The back part has its lower end 17 passing through a nonslip adjustable buckle 18 anchored adjacent the bottom of the backrest 13, thereafter it extends up the backrest and passes through a sliding buckle 19 anchored adjacent the top of the backrest and becomes the front part. The front part comprises a shoulder portion 20 extending downwards from the sliding buckle and having its lower end secured to one edge of a rectangular clasp ring 21, and a lap portion 22 having one end secured to an adjacent edge of the clasp ring 21 and its other end 23 passing through the nonslip adjustable buckle 18. Each buckle 18 is formed from two rectangular rings 24 each having a strengthening center bar 25. The ends 17, 23 of the strap are passed through both rings, round an outside edge 26 of one ring and back through the other ring as shown in FIG. 3; this provides a nonslip arrangement under strain but allows adjustment when the rings are held slightly apart. An anchor strap 27, one for each strap 14, is secured by a loop 28 to the rings 24, passes between the seat 12 and backrest 13 and at its lower end is firmly anchored by a bracket 29 and bolt 30 to a part 31 of the vehicle below and behind the back seat.

Each sliding buckle 19 comprises a pair of rectangular rings 32 having center bars 33, the strap passing through both rings, round the edge 34 of one ring and back through the other ring as shown in FIG. 4. This provides a nonslip arrangement under strain but allows the buckle to be slid along the strap when the rings are held slightly apart. The opposite edges of the ring 32 are hooked over a hook 35 anchored by a bolt 36 to a part 37 of the vehicle just behind the top of the seat backrest. The two clasp rings 21 are connected together in use by a clasp 38.

In operation, the shoulder portion of each strap is adjusted to the correct length for the clasp ring 21 to be at approximately the wearer's waist level with the shoulder portion extending over the wearer's shoulder by adjustment of the sliding buckle 19, the back part 15 is adjusted to bear against the seat backrest by adjusting the end 17 in the buckle 18 and the lap portion 22 is adjusted for length by adjusting the end 23 in the buckle 18. The safety belt is thus adjustable to suit wearers of different size, for example, from an average child of about 5 years of age to an adult. In addition the belt is such that upon impact of the vehicle causing a wearer to be thrown forward, the wearer is restrained by the front part of each strap and since the back part is exerting backward pressure on the seat backrest, this is also prevented from forward movement.

Referring next to FIGS. 5, 6 and 7, the clasp 38 has a rectangular base 39 having upwardly extending ribs 40 at each end which are joined to a central surface 41 by including flats 42. The top of the clasps comprises a rectangular locking plate 43 formed with upwardly extending fingers 44 at each end and a bolt 45 passes through the top and is secured centrally of the base 39 so that the top is rotatable on the bolt and is urged away from the base by a spring 46. The top is formed on its lower surface with a longitudinal groove 47 to engage with balls 48 which are spring urged outwardly of the ribs of the base but held captive therein in known manner so as accurately to locate the base and top of the clasp in the closed position. When the locking plate is parallel to the base with the rings 21 embracing the ribs 40 respectively the clasp is locked since there is insufficient space between the ribs and locking plate for the ring to pass between them. When the locking plate is rotated through 90° from the locked position there is sufficient space between the ribs and locking plate for the rings to pass easily between them, and should the seatbelt be under tension, so that the rings 21 tend to move apart, when the plate is rotated the engagement of the inner limb of each ring with the inclined flats 42 cause the rings to fly outwardly of the clasp.

An alternative clasp is shown in FIGS. 8, 9, 10. This comprises a disclike base member 49 having a central post 50 and a pair of diametrically opposed projections 51 on its upper surface joined to the upper surface by upwardly and outwardly inclined surfaces 52. A locking plate 53 is journaled on the post and a coil spring 54 with retaining cap 55 is interposed between the base member and the locking plate to urge these members apart. A transverse taper pin 56 extends through a hole at the top of the post to restrain the locking plate, and the top surface of the latter has a pair of angularly spaced grooves 57-58 of different depth radiating from its central bore, in which grooves the ends of the taper pin can be selectively accommodated by depression against the spring and rotation of the locking member. When the pin is in the deeper groove 57 the clasp is open and the rings 21 can be inserted on either side between the base member and locking plate to embrace the projections on the base member. When the locking member is then depressed and rotated to bring the pin into the shallower groove 58 the gap between the members is narrowed, and the diametrically opposed projections on the base member serve to retain the rings in the clasp. To release the rings, the locking member is again depressed and rotated to locate the taper pin in the deeper groove, and the inclined surfaces 52 guide the rings outwardly of the clasp. To this end the locking member may be provided with operating wings 59.

To prevent very small children from opening the clasp the spring strength may for example be up to about 20 lbs. the clasp may be made of metal or a plastics material. It will be understood that although the safety belt described is suitable for use by fairly small children it cannot be satisfactorily used to restrain very small children and babies for this purpose an auxiliary child's seat is provided. Referring to FIG. 11, this shows an auxiliary child's seat 60 suspended on the belt of FIGS. 1 to 4.

The seat 60 may be formed as a fiber pressing and comprises a back 61, a seat 62 and two generally triangular sidewalls 63 and 64 the outer edges of the back, the seat and the sidewalls being formed with a rolled lip and the lip together with the interior of the seat being padded and covered with a suitable washable plastics material. The back of the seat is also formed with a laterally extending flat (not seen) projecting as a bulge beyond the sidewalls 63 and 64 to help in stabilizing the seat against a vehicle backrest.

The back 61 of the seat if formed towards its upper end with a pair of transversely extending spaced-apart slots 65 through which the portions 20 of the belt are respectively threaded. The sidewalls 63 and 64 are formed with inclined slots through which the portions 22 are respectively threaded and the clasp 38 is carried at one end of an anchored leg strap 66 passing through a slot centrally of the front of the seat 62.

Inwardly of the seat 60 the strap parts 20 and 22 carry buckles 67 to prevent forward movement of the seat relative to these straps. In FIG. 12 part of the back 61 of the seat is shown with a slot 65 and a buckle 67 comprising a three-limb buckle through which the strap part 20 is threaded as indicated so that the buckle and strap passing around it lie flat against the inner surface 68 of the seat back. It will be understood that this particular arrangement permits adjustment of the buckles 67 to vary the lengths of the strap parts 20, 22 in front of the seats for different children to be accommodated within the seat but once the position shown in FIG. 12 is adopted the strap cannot pull through the buckle 67 and although the seat is merely suspended on the strap parts and is not secured thereto it cannot move forwardly of the strap parts beyond the position set by the buckles 67.

Still referring to FIG. 12, after the strap part 20 passes through the slot 65 it is threaded as indicated through the slipping buckle 19 as before.

The leg strap 66 serves not only as a retaining member for the clasp 38 but also provides a useful locating means for a baby's legs.

It will thus be understood that the present invention provides the combination of a safety belt with an auxiliary child's seat the latter being loosely located on the belt although restrained from forward movement relative thereto. In use therefore no reliance whatsoever is placed upon the strength of the seat structure in restraining a child secured therein the seat merely serving as a convenient means of accurately locating the safety belt on a small child or baby. Under impact both the seat and the child will be separately restrained by the belt so that the seat could, if desired, be a lightweight shell of low inherent strength.

The seat described with reference to FIG. 11 tends to be expensive to produce and furthermore, while it can readily be removed from engagement with the safety harness so that the latter may be used for an older child or an adult such removal entails disconnection of a number of the straps of the safety belt and subsequent readjustment of the harness to fit the person concerned.

In the alternative seats shown in FIGS. 13 and 14, the seat 70 comprises a sitting platform 71 hinged as indicated diagrammatically at 72 with a backrest 73, the platform and the backrest both being suitable upholstered as at 74 and covered with decorative and waterproof plastics material. The seat has a pair of tubular metal arm rests indicated at 75, the lower end one of which is shown pivoted at 76 to the associated side edge of the sitting platform 71. The upper end of each armrest passes alongside the associated side edge of the backrest 73 and is bent to constitute a bridging bar 77 extending across the rear surface of the backrest and being bent at its other end (not shown) to merge into the upper end of the other arm the lower end of which is similarly pivoted to the other side edge of the sitting platform 71. In its operative position, the bridging bar 77 is engaged by clips secured to the rear surface 78 of the backrest one such clip being shown at 79 and it will be understood that by disengagement of the bridging bar 7 from these clips armrests may be jointly pivoted and the seat folded about the hinge 72 until the backrest and the sitting platform 71 are aligned for storage purposes. Towards its upper end the rear surface 78 of the backrest is provided with a pair of transversely spaced hooks one of which is shown at 80 and towards its lower end the rear surface has a pair of transversely spaced clips one of which is shown at 81.

The auxiliary child's seat 70 is intended to be supported by the back portions 15 of the safety belt closely embracing the backrest of the rear seat of a vehicle. For this purpose this strap part at a position a part way down the seat backrest carries a buckle indicated at 83, to be engaged by the hook 80. Towards the lower end of the seat backrest the strap part 15 is engaged by the clip 81 and it will be understood that the other similar strap part 15, embracing the seat backrest is similarly engaged by the other one of the hooks such as 80 and clips such as 81 to suspend the auxiliary child's seat on these strap parts. The buckle 83 is shown in detail in FIG. 15 and comprises a three three-limbed buckle 83A and a D-shaped buckle 83B in which hook 80 is engaged. The strap part 15 extends in front of the upper limb of the buckle 83A, behind the middle limb through the D-shaped buckle in front of buckle 83A and behind the lower limb of that buckle.

The harness parts 20 are indicated passing over the top of the backrest 73 of the auxiliary seat and the parts 22 passing through the space between the sitting platform 71 and the armrests 75. It will here be understood that for this purpose the nonslip buckles 18 must be disengaged. Alternatively, if the armrests such as 75 were not joined by the bridging bar 77 it will be appreciated that no such disengagement of these nonslip buckles would be necessary.

In operation a child may be supported in the seat rest by the safety harness and in the event of a collision causing the child to be thrown forwards the safety belt parts such as 15 around the vehicle backrest will restrain forward movement of the auxiliary child's seat.

Although as described above the auxiliary child's seat is particularly suitable for use with the seatbelt described it will be understood that it could equally well be used with any seatbelt having a strap part or parts suitably engaging over the rear seat backrest of a vehicle. In addition the auxiliary seat shown in FIGS. 11 and 12 could be suspended on the strap or straps of a belt other than that described. In addition the buckles 19 need not be anchored to a part of the vehicle structure at the top of the seat backrest but may be secured to further anchor straps anchored adjacent the floor of the vehicle.

I claim:

1. A safety belt comprising a strap capable in operation of being looped over a wearer's shoulder so that one part of the strap extends down the front of the wearer and the other part of the strap extends down the back of the wearer and is secured at its end to an anchorage member, the part of the strap extending down the front of the wearer being adjustably secured at its end intermediate the ends of the part extending down the back of the wearer, means being provided for attaching the top of the loop to an anchorage behind the top of a vehicle seat backrest, the arrangement being such that in operation the part of the strap arranged to extend down the front of the wearer restrains forward movement of the wearer and the other part of the strap extends down the front surface of the backrest to restrain forward movement of the back rest.

2. A safety belt for use on the seat of a vehicle comprising a strap having a back part intended in operation to contact the front surface of the seat backrest and having means for anchoring its lower end to a part of the vehicle structure below the bottom of the seat backrest and means at its upper end for anchorage behind the top of the seat backrest, and a front part intended in operation to pass in front of the wearer, the front part connecting at its upper end with the back part, at an intermediate point carrying a clasp attachment means and its lower end adjustably secured intermediate the ends of the back part, each of the front and back parts being adjustable in length, and a releasable clasp for connection to the clasp attachment means to form a lap connection.

3. A safety belt in which there are two similar straps each having a back part and a front part according to claim 2, and in which the clasp is for connecting the two clasp attachment means.

4. A safety belt according to claim 3 in which the front and back parts of each strap are parts of a continuous strap, passing through an anchored nonslip buckle at the top and having its lower ends passing through a nonslip anchored buckle adjacent the bottom of the backrest.

5. A safety belt for a vehicle according to claim 3 wherein said straps terminate in nonslip adjustable buckles in front of the lower part of the backrest, and said pair of straps each have a back part extending from a respective one of the buckles upwardly over the front surface of the backrest through a sliding buckle anchored to a location behind the backrest.

6. A safety belt according to claim 5 in which each sliding buckle comprising a pair of rectangular rings, a loop of the strap passing through one ring and containing one edge of another ring so that when pulled tight the strap cannot slip but under no strain the buckle can be slid along the strap.

7. A safety belt according to claim 5 in which each sliding buckle is adapted to be hooked over a respective hook anchored to the vehicle.

8. A safety belt according to claim 5 in which each nonslip adjustable buckle comprises a pair of rectangular rings, the ends of each strap portion passing through each ring, round one edge of one ring and back through the other ring.

9. A safety belt according to claim 8 in which the other edges of the rings are attached to a loop of a respective one of the anchor straps.

10. A safety belt according to claim 5 in which the front part of each strap carries a clasp ring, the clasp rings being for attachment together by means of the clasp.

11. A safety belt according to claim 10 in which the clasp comprises a base member having a pair of projections at opposite sides extending upwardly from the upper surface of the base member, and a locking member mounted on a post on the base member for rotation between a locked position in which the clasp rings cannot be moved between the projections and the locking member, and an open position in which there is a sufficient gap between the projections and the locking member to allow easy movement of the clasp rings therebetween and in which the projections are joined to the upper surface of the base member by upwardly and outwardly inclined surfaces.

12. A safety belt according to claim 11 in which the clasp includes spring means urging the locking member away from the base member.

13. A safety belt according to claim 11 in which the locking member is rectangular.

14. A safety belt according to claim 11 in which the locking member is axially movable on the post between the locked position and the open position.

15. A safety belt according to claim 14 including a transverse pin on the post the upper surface of the locking member being formed with a groove which is parallel to the pin in the open position to allow the locking member to move along the post from the base member.

16. A safety belt according to claim 15 including a further groove of less depth than the first groove and arranged to accommodate the pin in the locked position to prevent the locking member from rotating until it is depressed against the action of spring means.

17. The safety belt of claim 2 which comprises a pair of straps each having front and back parts and anchoring means as described, said releasable clasp releasably interconnecting said clasp attachment means of each strap to form a lap connection between the straps of the pair.

* * * * *

UNITED STATES PATENT OFFICE
CERTIFICATE OF CORRECTION

Patent No. 3,633,965          Dated January 11, 1972

Inventor(s) Neville M. Norman and Derek C. Morley

It is certified that error appears in the above-identified patent and that said Letters Patent are hereby corrected as shown below:

On the cover page, after Inventors indicate:

Assignee: Cleaver Hume International Ltd., London, England

Signed and sealed this 28th day of January 1975.

(SEAL)
Attest:

McCOY M. GIBSON JR.          C. MARSHALL DANN
Attesting Officer            Commissioner of Patents